United States Patent [19]

Cuvillier

[11] Patent Number: 4,687,310
[45] Date of Patent: Aug. 18, 1987

[54] STEREOSCOPIC PHOTOGRAPHY CAMERA

[76] Inventor: Roger Cuvillier, 2 bis Avenue de la Ière Armée, 21000 Dijon, France

[21] Appl. No.: 871,895

[22] Filed: Jun. 9, 1986

[30] Foreign Application Priority Data

Jun. 12, 1985 [FR] France .................................. 85 08885

[51] Int. Cl.$^4$ .............................................. G03B 35/08
[52] U.S. Cl. ................................................... 354/115
[58] Field of Search ......................... 354/112, 114, 115

[56] References Cited

U.S. PATENT DOCUMENTS 2,771,013 11/1956 Mast ..................................... 354/115
3,018,708 1/1962 Rentschler ........................... 354/114

FOREIGN PATENT DOCUMENTS

877246 5/1953 Fed. Rep. of Germany ...... 354/114
711601 6/1931 France ................................. 354/115

Primary Examiner—Donald A. Griffin
Attorney, Agent, or Firm—Laubscher & Laubscher

[57] ABSTRACT

A stereoscopic camera contains a photosensitive medium to be exposed by two juxtaposed images on either side of a symmetry plane, two first symmetrical lenses centered perpendicularly to the centers of images and spaced from a small stereoscopic base, and two second symmetrical lenses designed for photography with a large stereoscopic base. So as to record a stereoscopic couple always in a same position on the medium, preferably having dimensions of a standard slide, whatsoever one of three selected stereoscopic bases, the second lenses are located on second optical path sections between and perpendicular to optical axis of the first lenses and first optical path sections spaced from the large base, and the camera comprises reflecting means along axis of the first lenses for focusing incident optical beams having crossed through the second lenses. The reflecting means includes two central pivotable totally-reflecting or fixed semi-reflecting mirrors, and two fixed side mirrors. Stereoscopic couples can be taken with a mean stereoscopic base equal to the distance between one of second optical path sections and one of the first lens axis located on either side of the symmetry plane.

18 Claims, 5 Drawing Figures

STEREOSCOPIC PHOTOGRAPHY CAMERA

BACKGROUND OF THE INVENTION

1- Field of the Invention

The present invention relates, generally speaking, to a camera designed for taking stereoscopic or three dimensional photographs with one of three stereoscopic bases, through two lenses respectively out of four fastened to the camera.

2- Description of the Prior Art

More especially the present invention relates to stereoscopic photography camera comprising a photosensitive medium to be exposed by two juxtaposed images arranged symmetrically about a symmetry plane perpendicular to the medium, two first rectilinear optical paths perpendicular to the medium, passing through centers of the images and spaced from a small stereoscopic base, two second optical paths symmetrical to the symmetry plane and including two first optical sections perpendicular to the medium and spaced from a large stereoscopic base, two first lenses centered on the first optical paths, and two lenses located on the second optical paths, the images being substantially located in an image focal plane common to the first and second lenses.

Such a camera having stationnary lens mounts, in which the second lenses have optical axes colinear with the first optical sections respectively, the second optical paths being wholly rectilinear and perpendicular to the photosensitive medium, is known under the name of NIMSLO 3D. This camera can record three stereograms taken respectively with three constant stereoscopic bases. A first stereogram is taken with a small base of 18 mm equal to the distance between the first optical paths and is composed of first images photographed through the first lenses. A second stereogram is taken with a mean base of 2×18=36 mm equal to the distance between one of the first optical paths and one of the second optical paths, on either side of the symmetry plane of the camera, and consists of two second images photographed with the corresponding first and second lenses between which a medium surface on which no image is produced, corresponds to the emplacement of one of the first images. A third stereogram is taken with a large base of 3×18=54 mm equal to the distance between the first optical sections or the second optical paths and consists of two third images photographed through the second lenses.

Whatever the stereogram selected, it appears that the stereogram is contained in a photosensitive medium area having a width equal to double that of the standard format of a 24×36 mm² slide. Thus with a photographic film or 36 slides, only 18 stereogram can be produced with the NIMSLO 3D camera.

Moreover, to transpose the stereograms taken with the mean or large base into a standard slide frame in view of projecting the stereograms with a standard slide projector, a special printer must be used which still further increases the film developing costs. Stereograms printed from an original test print often result in a loss of quality, such as sharpness and color reproduction.

OBJECTS OF THE INVENTION

The main object of this invention is to provide a stereoscopic camera in which a recorded stereoscopic couple always occupies the same place whichever of the three stereoscopic bases is selected. When this place is a surface equal to a standard slide, each stereogram is developed and mounted by any photographic laboratory, as with an ordinary slide and at the same price, without requiring any form of special print, and can be directly projected.

Another object of this invention is to provide a stereoscopic optical system wherein the second optical paths spaced from the large stereoscopic base converge to the first optical paths spaced from the small stereoscopic base respectively, i.e. a second optical path and a first optical path located on a same side of the symmetry plane of the camera have a common section perpendicular to and in front of the photosensitive medium.

Another object of this invention is to provide a stereoscopic camera having four lenses which are stationnary and located so as to take with three stereoscopic bases three stereograms exposing the same place of a photosensitive medium of the camera.

A further object of this invention is to provide a stereoscopic camera in which all the optical members, such as lenses and mirrors, are stationnary, and all the stereograms have identical dimensions and a same place on a photosensitive medium of the camera, whatever the stereoscopic base selected out of three.

Still another object of this invention is to select one of three stereoscopic bases in a stereoscopic camera by means of shutters of four lenses, without requiring any moving of lenses and other optical members, such as mirrors.

SUMMARY OF THE INVENTION

In accordance with the above objects, there is provided a sterescopic camera comprising.

a photosensitive medium of two juxtaposed images arranged symmetrically to a symmetry plane perpendicular to the medium, two first optical paths perpendicular to the medium, passing through centers of the images respectively, and spaced from a small stereoscopic base, two second optical paths symmetrical to the symmetry plane and including two first optical sections which are perpendicular to the medium and spaced from a large stereoscopic base, two first lenses centered on the frist optical paths, and two second lenses located on the second optical paths, the images being substantially located in an image focal plane common to the first and second lenses, and the second optical paths including reflecting means for focusing incident optical beams directed along the first optical sections and crossing through the second lenses into the two juxtaposed images.

Generally speaking the invention proposes the use of four lenses with mounts built into the camera and offering optical axes perpendicular two by two, and two fixed reflecting surfaces placed 45° to the optical axes and two other pivoting reflecting surfaces, or two other stationnary semi-reflecting surfaces to obtain two juxtaposed images whatever the stereoscopic base selected out of the three.

According to a first embodiment, the reflecting means comprises two first reflecting mirrors pivoting between first positions external to the first optical paths and second positions inclined 45° to and centered on the first optical paths, and two second fixed reflecting mirrors respectively parallel to the second positions of the first mirrors and centered on the first optical sections.

Each of the second lenses is centered on a second optical section of one of the second optical paths. This second optical section is perpendicular to the first optical paths and extends between centers of one of the second mirrors and the second position of one of the first mirrors located on a same side of the symmetry plane.

According to another embodiment, the reflecting means comprises two fixed semi-reflecting mirrors inclined 45° to and centered on the first optical paths, and two second fixed totally-reflecting mirrors respectively parallel to the first mirrors and centered on the first optical sections. Each of the second lenses is centered on a second optical section of one of the second optical paths. This second optical section is perpendicular to the first optical paths and extends between centers of one of the second mirrors and one of the first mirrors located on the same side of the symmetry plane.

Thus, through a partial transfer of the second optical paths to the first optical paths, via the mirrors, a stereogram is recorded on the same image place of the photosensitive medium, whatever the stereoscopic base selected.

According to another feature of this invention, the camera comprises means located on a frontal side of the camera for housing a removable focusing lens installed in front of the first lenses. The focusing lens forms a single converting front-lens, covering the two first close and fixed lenses corresponding to the small stereoscopic base.

The use of the small base is recommended when photographing subjects very close to the camera, if the distance from the subject is short, between 10 and 20 times the small base; the images produced directly by the two first lenses are not substantially centered on the optical axes of these latter formed by the first optical paths. This involves a difficulty in merging the two images when observing the image couple. Moreover the contribution made by the front-lens is facilitated also by the short distance between the first lenses and by their fixed position.

BRIEF DESCRIPTION OF THE DRAWING

The foregoing and other objects, features and advantages of the invention will be apparent from the following detailed description of several preferred embodiments of the invention with reference to the corresponding accompanying drawings in which.

DESCRIPTION OF THE PREFERRED EMBODIMENTS

Figure 1:
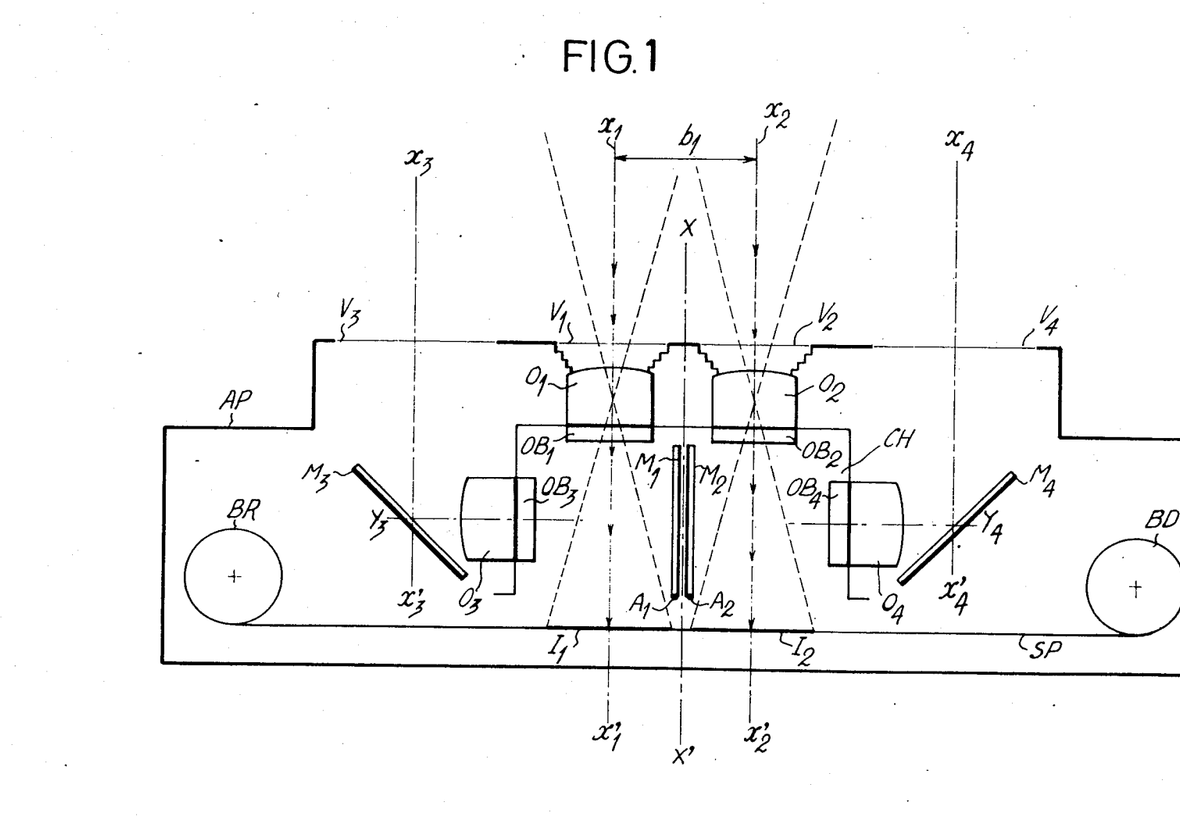
FIG. 1 is a schematical top view of the inside of a stereoscopic camera embodying the invention, in which first pivotable mirrors are positioned in view of photography with a small stereoscopic base.
Figure 3:
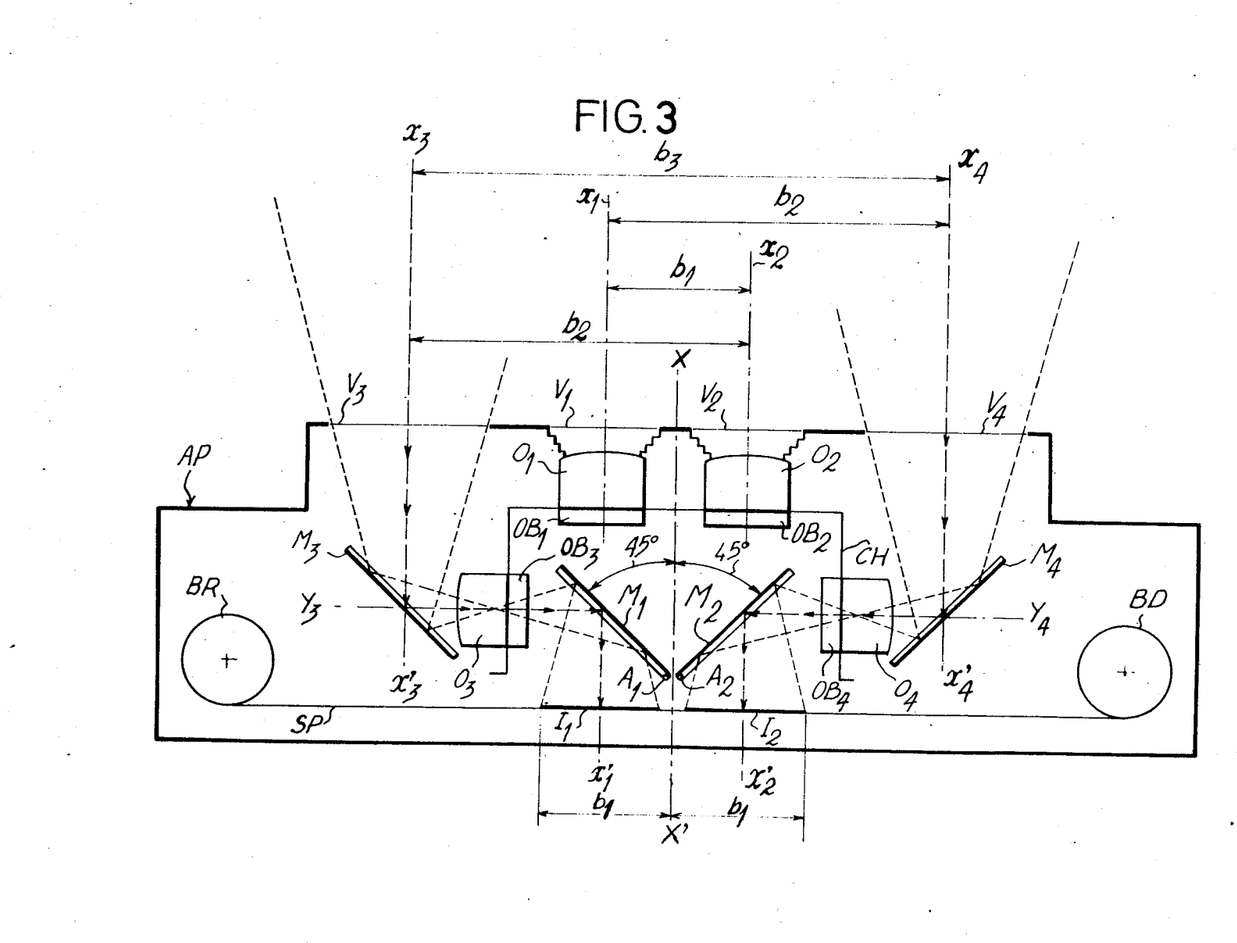
FIG. 3 is a schematical top view of the inside of the camera in which the first mirrors are positioned in view of photography with a large stereoscopic base.
Figure 4:
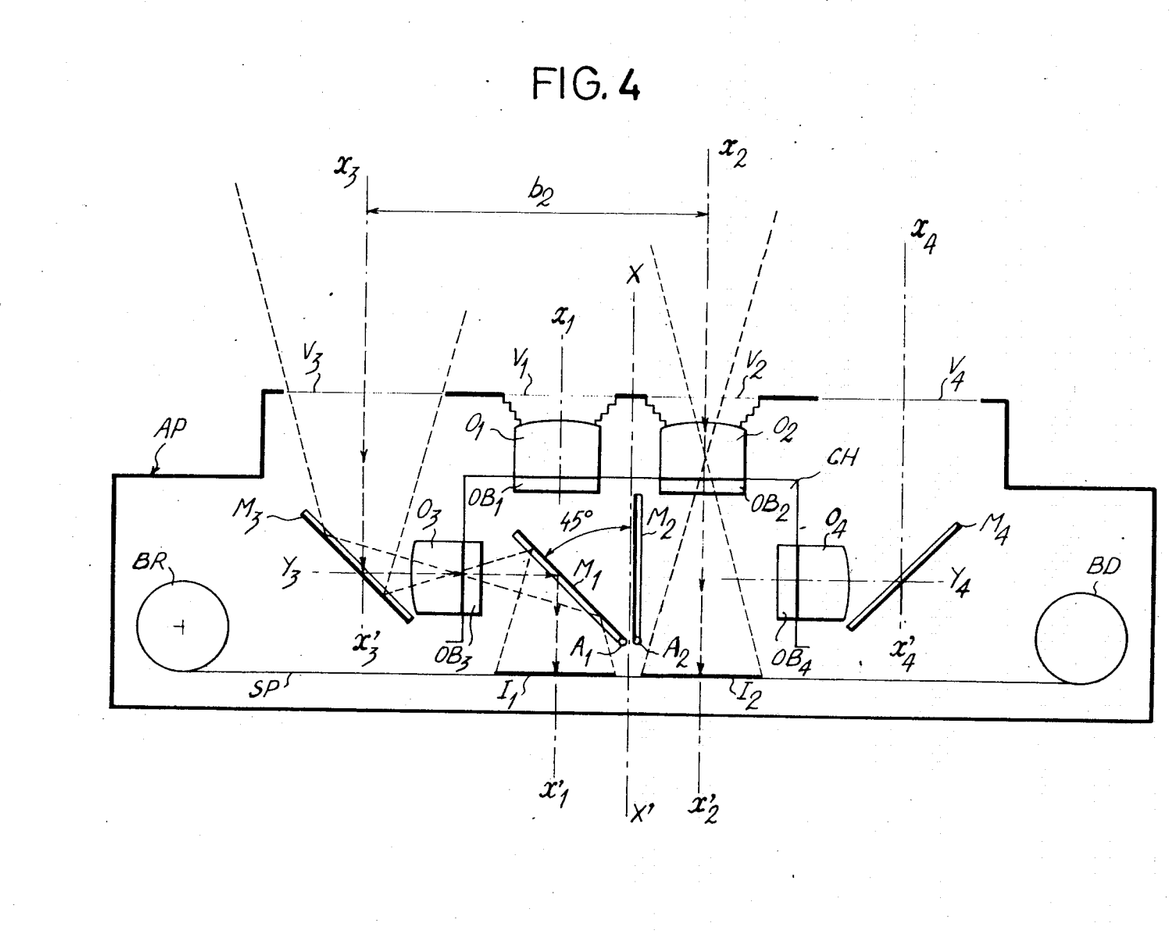
FIG. 4 is a schematical top view of the inside of the camera in which the first mirrors are positioned in view of photography with a mean stereoscopic base.

Referring to FIG. 1, a stereoscopic optical system included, at least partially, in a dark room CH of a camera AP is symmetrical about a vertical transverse plane plotted XX' in FIGS. 1, 3 and 4, perpendicular to a photosensitive medium or surface SP located at the back of the room. The photosensitive medium is a photographic film unwound longitudinally in a vertical image plane between a feed reel BD and a take-up reel BR. The optical system offers two first rectilinear, symmetrical optical paths, and two second symmetrical optical paths. The first and second optical paths extend between circular sighting orifices $V_1$, $V_2$ and $V_3$, $V_4$ respectively that are made in a front wall of the camera, and two symmetrical monoscopic image surfaces $I_1$ and $I_2$ juxtaposed on medium SP. The four optical paths are arranged in a horizontal plane coplanar to a longitudinal unwinding axis of medium SP.

The first optical paths are rectilinear and defined by horizontal optical axes $x_1x'_1$ and $x_2x'_2$ of two first lenses, or combinations of lenses, $0_1$ and $0_2$ passing through centers of the symmetrical orifices $V_1$ and $V_2$ and images surfaces $I_1$ and $I_2$ respectively, and perpendicular to medium SP. Lenses $0_1$ and $0_2$ are incorporated into the camera, and can be set quite well back from the front wall of the camera AP. The optical centers of lenses $0_1$ and $0_2$ are separated by a distance equal to a small stereoscopic base $b_1$. Between lenses $0_1$ and $0_2$ and the image surfaces $I_1$ and $I_2$ are provided two first totally-reflecting, vertical plane mirrors $M_1$ and $M_2$ which are pivotable around respective vertical axes $A_1$ and $A_2$ in the vicinity of plane XX' with a clearance of 45° each. When mirrors $M_1$ and $M_2$ are in first positions parallel to the plane XX' to entirely clear the first optical paths $x_1x'_1$ and $x_2x'_2$, as shown in FIG. 1, the two lenses $0_1$ and $0_2$ focus directly in the plane of medium SP, two juxtaposed images $I_1$ and $I_2$ forming a stereoscopic couple of a photographed object taken with the small base $b_1$.

The first lenses $0_1$ and $0_2$, at a distance away equal to the small stereoscopic base $b_1$, being normally designed for stereoscopic photography of close up objects, and the photosensitive medium SP being located in the focal plane of the lenses, combined with object planes near to the infinite, it is necessary to provide lenses $0_1$ and $0_2$ with means of focusing on close objects.

Figure 2:
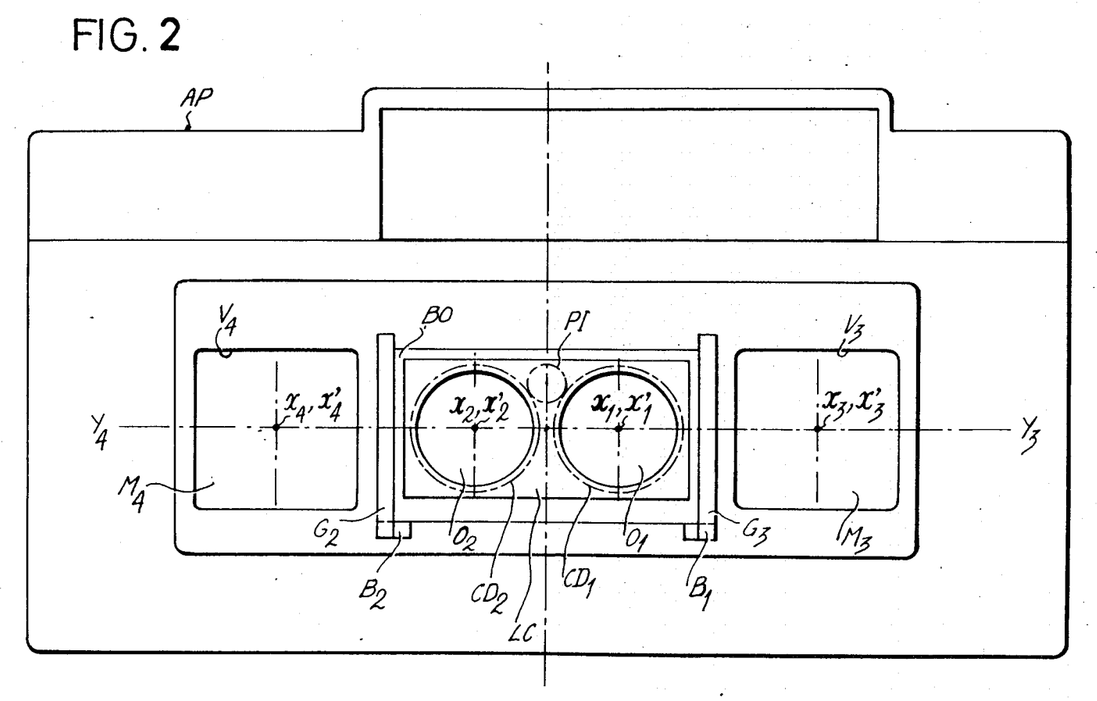
FIG. 2 is schematical front view of the camera with a central removable convergent front-lens placed in front of two first lenses in the camera, or provided with axial displacement type first lenses.

For this purpose the camera preferably is provided with a supplementary front-lens BO covering the fields of the two lenses $0_1$ and $0_2$. In addition to setting the focusing on the object located in the focal plane of the front-lens, the focusing means provide centering of the images on the optical axes $x_1x'_1$ of lenses $0_1$ and $0_2$. As shown in FIG. 2, the front-lens BO includes a removable, rectangular frame containing a converging or focusing lens LC. Two symmetrical rails $G_1$ and $G_2$ between which front-lens B is fitted, sliding vertically, are fastened to the front wall of the camera, practically at mi-distance between axes $x_1x'_1$ and $x_3x'_3$ and axes $x_2x'_2$ and $x_4x'_4$. Stops $B_1$ and $B_2$ at the lower end of the rails $G_1$ and $G_2$ hold the front-lens BO strung on from the top, and center lens LC in relation to the plane axis $x_1x'_1$ and $x_2x'_2$. The focusing lens LC is a plano-convex lens with a convex diopter oriented in the opposite direction to lenses $0_1$ and $0_2$ and offering a power selected depending on the distance to the object to be photographed, so as to modify the focal length of lenses $0_1$ and $0_2$.

According to another embodiment, focusing on close objects is obtained by associated axial displacements of the first lenses $0_1$ and $0_2$. For example, each of the two focusing means is obtained through an external thread in a cylindrical mount of lenses $0_1$ and $0_2$, cooperating with the tapping of a bore in the front wall of the camera. By screwing up or unscrewing the mount of lenses $0_1$, $0_2$, this moves the lens along optical axis $x_1$, $x'_2$ and thus modifies the focusing depending on the distance to the object photographed.

The focusings of the two lenses $0_1$ and $0_2$ are synchronized, for example, via a small central pinion PI revolving manually around a horizontal axis located in the symmetry plane XX' and cooperating with two ring gears $CD_1$ and $CD_2$ fastened around the mounts of the respective lenses $0_1$ and $0_2$, as shown in FIG. 2; in this case the threads on the mounts of the lenses are in the same direction, to the left or to the right.

According to another embodiment, the focusings of lenses $0_1$ and $0_2$ are synchronized by two ring gears $CD_1$ and $CD_2$ placed around the mounts of the lenses and gearing to each other at the level of symmetry plane XX'; in this case the threads of the mounts of the lenses are in opposite directions, one to the left and the other to the right.

According to still another embodiment, the focusing of lenses $0_1$ and $0_2$ is obtained automatically on the object occupying a central position in the field of view via a device known under the name of "autofocus".

The second optical paths each consist of three horizontal sections.

A first section of a second optical path is defined by an incident optical axis $x_3x'_3$, $x_4x'_4$ between a center of the respective orifice $V_3$, $V_4$ and a center of a second fixed, totally-reflecting and vertical plane mirror $M_3$, $M_4$. The first sections are parallel and coplanar to optical axes $x_1x'_1$ and $x_2x'_2$ and are distant from a large stereoscopic base $b_3$. The mirrors $M_3$ amd $M_4$ are installed in planes perpendicular to each other and have reflecting surfaces inclined 45° to axis $x_3x'_3$ and $x_4x'_4$ and oriented towards the front wall of the camera and plane XX'.

Second sections of the second optical paths are colinear to a horizontal optical axis $Y_3Y_4$ perpendicular to axes $x_1x'_1$ and $x_2x'_2$ and are each located between the center of a respective, fixed mirror $M_3$, $M_4$ and the respextive axis $x_1x'_1$ and $x_2x'_2$. The second sections transmit incident optical beams crossing through orifices $V_3$ and $V_4$ and reflected by mirrors $M_3$ and $M_4$. Second symmetrical lenses $0_3$ and $0_4$ and interposed in the second sections and have axis $Y_3Y_4$ as common optical axis. Lenses $0_3$ and $0_4$ are fastened in the camera.

Third sections of the second optical paths are defined by segments of parallel axes $x_1x'_1$ and $x_2x'_2$ and extend between axis $Y_3Y_4$ and the centers of the image surfaces $I_1$ and $I_2$, respectively, and more precisely, the third sections are located between the centers of the image surfaces $I_1$ and $I_2$ and centers of the first mirrors $M_1$ and $M_2$ when mirrors $M_1$ nd $M_2$ are in second positions, perpendicular to each other, so that their reflecting surfaces are respectively parallel and opposite the reflecting surfaces of the second mirrors $M_3$ and $M_4$, as shown in FIG. 3. In these second positions, mirrors $M_1$ and $M_2$ blank off the incident optical beams crossing through the first immobile lenses $0_1$ and $0_2$ and reflect the beams reflected by the second mirrors $M_3$ and $M_4$ crossing through the second immobile lenses $0_3$ and $0_4$ as to expose the photosensitive medium SP via a stereoscopic couple $I_1+I_2$ taken with the large base $b_3$.

The distance between the axes $x_1x'_1$ and $x_4x'_4$ and the distance between axes $x_2x'_2$ and $x_3x'_3$ are equal to a mean or intermediate stereoscopic base $b_2=(b_1+b_3)/2$. As shown in FIG. 4, when one of the first mirrors, such as mirror $M_2$, is positioned parallel to the symmetry plane XX', and the other first mirror, such as mirror $M_1$, is inclined 45° to axis $Y_3Y_4$ and thus to axis $x_1x'_1$, a stereogram $I_1+I_2$ is taken with the mean base $b_2$ and consists of an image $I_2$ projected by the first lens $0_2$ whose optical axis $x_2x'_2$ is cleared by the first parallel positionned mirror $M_2$, and of an image $I_1$ projected by the second lens $0_3$ via the first inclined mirror $M_1$. A stereoscopic photography with the mean base $b_2$ is thus obtained using one of the first optical paths, such as path $x_2x'_2$, and one of the second optical paths, such as path $x_3x'_3+Y_3Y_4+x_1x'_1$, located on the other side of the symmetry plane XX' with respect of the first optical path $x_2x'_2$.

Figure 5:
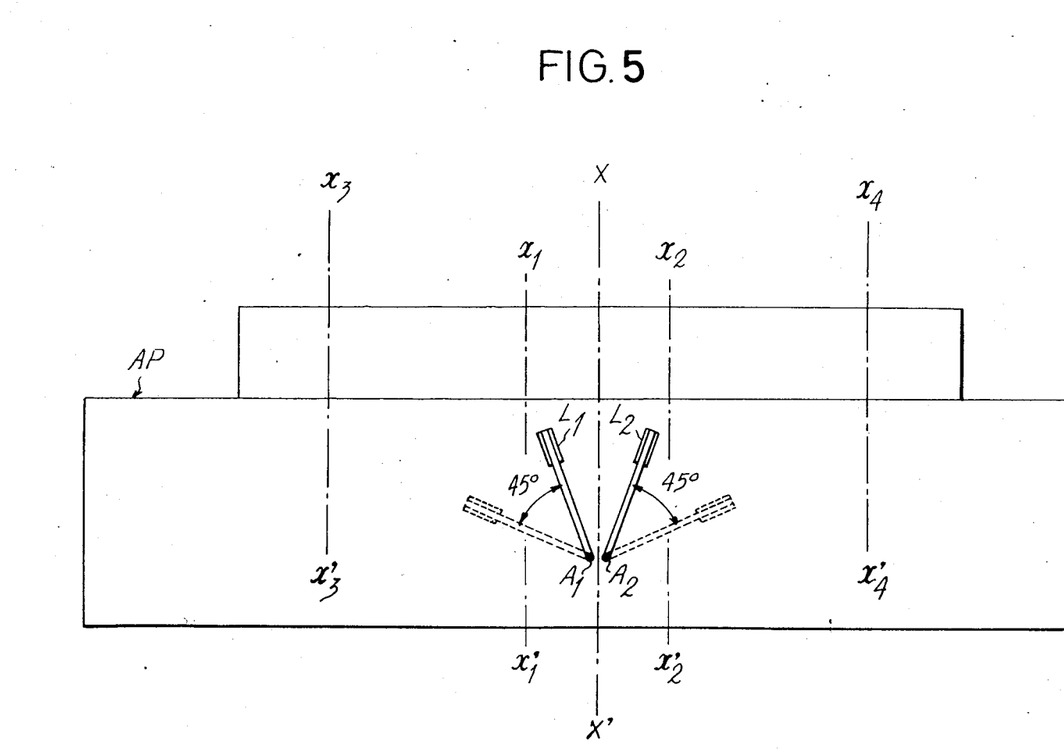
FIG. 5 is a schematical bottom view of the outside of the camera.

As shown in FIG. 5, individual rotations of the first mirrors $M_1$ and $M_2$ with circular clearance of 45° limited by stops inside the camera, are obtained respectively by two small horizontal levers $L_1$ and $L_2$ located underneath the housing of the camera AP and secured to axles $A_1$ and $A_2$. Such a gripping means for only pivoting mirrors $M_1$ and $M_2$ independently of each other, in relation to immobile lenses $0_1$, $0_3$ and $0_2$, $0_4$, is compatible with the precision required to expose the photosensitive medium SP via two correctly juxtaposed views.

The optical lengths along the first optical paths between the optical centers of the first lenses $0_1$ and $0_2$ and the centers of images $I_1$ and $I_2$, and the optical lengths along the second optical paths between the optical centers of the second lenses $0_3$ and $0_4$ and the centers of images $I_1$ and $I_2$ are equal to the identical focal length of lenses $0_1$ to $0_4$.

According to a preferred embodiment, the focal legnth of lenses $0_1$ to $0_4$ is equal to 30 mm so as to correspond to a normal field. This short focal length, moreover, provided a depth of field allowing for fixed focus lenses set on the hyperfocal length. The surfaces of images $I_1$ and $I_2$ form a stereogram to standard 24×36 mm² format, consisting of two rectangular monoscopic images each having a width of 18 mm and a height of 24 mm and having centers spaced from 18 mm. In this case, the small base $b_1$ is equal to 18 mm. The large base $b_3$ is for example 70 mm, and hence the mean base $b_2$ is equal to $(70+18)/2=44$ mm. Whatever the base selected by levers $L_1$ and $L_2$ positioning the first mirrors $M_1$ and $M_2$, the stereogram inserts into the 24×36 mm² format of a slide directly insertable in a standard 50×50 mm² frame and which can be projected with a slide projector.

The small base $b_1=18$ mm is selected in view of macrophotography with a front-lens, i.e. practically for photography of objects from 1 m to 25 cm away. The mean base $b_2=44$ mm is selected for all subjects to be photographed at mean distance between 1 and 3 m, such as an indoor scene with a flash. The large base $b_3=70$ mm is selected for all subjects to be photographed, such as a landscape, from 3 m to the infinite, with sensitive perception of the depth even in the distances.

According to other alternative embodiments, the stereogram consists of two images, each of 7.5×10 cm² and occupies a standard surface of 10×15 cm² of a color film.

According to another embodiment, the first mirrors $M_1$ and $M_2$ no longer pivot around axles $A_1$ and $A_2$, but are fastened at positions inclined 45° to axes $x_1x'_1$ and $x_2x'_2$, as shown in FIG. 3. Mirrors $M_1$ and $M_2$ are no longer totally reflector, but each consists of a semi-transparent or so-called semi-reflecting plate. Lenses $0_1$ and $0_2$ and lenses $0_3$ and $0_4$ still simultaneously form respective images $I_1$ and $I_2$ at the same positions on the photosensitive medium SP.

Especially for this other embodiment, the stereoscopic base is selected by a device simultaneously controlling two shutters selected from four $OB_1$ to $OB_4$ on lenses $0_1$ to $0_4$. The small base $b_1$ is selected by opening shutters $OB_1$ and $OB_2$ associated to lenses $0_1$ and $0_2$ and closing shutters $OB_3$ and $OB_4$ associated to lenses $0_3$ and $0_4$; the mean base $b_2$ is selected by opening shutters $OB_2$ and $OB_3$ and closing the other two shutters $OB_1$ and $OB_4$, or by opening shutters $OB_1$ and $OB_4$ and closing shutters $OB_2$ and $OB_3$. The large base $b_3$ is selected by opening the second shutters $OB_3$ and $OB_4$ and closing the first shutters $OB_1$ and $OB_2$. The shutters can be mechanical like diaphragm shutters, or preferably, programmed or opto-electronic shutters such as electronically controlled photochrom glass or liquid crystal shutters. In this latter case the stereoscopic base selected is displayed in a viewfinder of the camera AP.

What I claim is:

1. A stereoscopic camera comprising
a photosensitive medium of two juxtaposed images arranged symmetrically to a symmetry plane perpendicular to the medium,
two first optical paths perpendicular to said medium, passing through centers of said images respectively, and spaced from a small stereoscopic base,
two second optical paths symmetrical to said symmetry plane and including two first optical sections which are perpendicular to said medium and spaced from a large stereoscopic base,
two first lenses centered on said first optical paths, and
two second lenses located on said second optical paths,
said images being substantailly in an image focal plane common to said first and second lenses, and
said second optical paths including reflecting means for focusing incident optical beams directed along said first optical sections and crossing through said second lenses into said two juxtaposed images.

2. The stereoscopic camera claimed in claim 1 wherein
said reflecting means comprises two first reflecting mirrors pivoting between first positions outside said first optical paths and second positions inclined 45° to and centerd on said first optical paths, and two second fixed reflecting mirrors respectively parallel to said second positions of said first mirrors and centered on said first optical sections, and
said second lenses are respectively centered on two second optical sections in said second optical paths and,
each of said second optical sections is perpendicular to said first optical paths and extends between centers of one of said second mirrors and said second position of one of said first mirrors located on a same side of said symmetry plane.

3. The stereoscopic camera claimed in claim 2 wherein said first positions of said first mirrors are substantially parallel to and in the vicinity of the symmetry plane.

4. A stereoscopic camera claimed in claim 2 comprising two gripping means partially outside a camera housing for pivoting respectively and individually said two first mirrors around axles perpendicular to said optical paths.

5. The stereoscopic camera claimed in claim 1 wherein
said reflecting means comprises two fixed semi-reflecting mirrors inclined 45° to and centered on said first optical paths, and two second fixed reflecting mirrors respectively parallel to said first mirrors and centered on said first optical sections, and
said second lenses are respectively centered on two second optical sections in said second optical paths, and
each of said second optical sections is perpendicular to said first optical paths and extends between centers of one of said second mirrors and one of said first mirrors located on a same side of said symmetry plane.

6. A stereoscopic camera as claimed in claim 1 comprising means located on a front side of said camera for housing a removable focusing lens installed in front of said first lenses.

7. A stereoscopic camera as claimed in claims 1 comprising means for focusing said first lenses synchronously.

8. The stereoscopic camera claimed in claim 7 wherein said focusing means comprises two ring gears installed around first lenses mounts screwed into said camera, said ring gears cooperating with a pinion, and said mounts having threads in the same directions.

9. The stereoscopic camera claimed in claim 7, wherein said focusing means comprises two ring gears installed around first lenses mounts screwed into said camera, said ring gears gearing together, and said mounts having threads in opposite directions.

10. A stereoscopic camera as claimed in claim 1 comprising four shutter means associated respectively to said four lenses, and means for simultaneously controlling respectively
an opening of the two shutter means associated to said first lenses and a closing of the two shutter means associated to said second lenses,
an opening of the twoshutter means associated to one of said first lenses and to one of said second lenses and the closing of the two other shutter means, and
an opening of the shutter means associated to said second lenses and a closing of the two shutter means associated to said first lenses.

11. The stereoscopic camera as claimed in claim 1 wherein said small and large bases are equal to 18 mm and 70 mm respectively.

12. A stereoscopic camera comprising
a photosensitive surface of two juxtaposed images,
two first rectilinear optical paths perpendicular to said medium, passing through centers of said images respectively, and spaced from a first stereoscopic base,
two second optical paths each having a first optical section perpendicular to said photosensitive surface and a second optical section parallel to said photosensitive surface, said first optical sections being spaced from a third stereoscopic base more than said stereoscopic base, two first reflecting mirrors pivoting between first positions outside said first optical paths and second perpendicular positions inclined 45° to and centered on said first optical paths and second optical sections respectively, two second perpendicular fixed relfecting mirrors respectively parallel to said second positions of said first mirrors and centered on said first and second optical sections respectively, two first lenses centered on said first optical paths and located in front of said second positions of said first mirrors respectively, and two second lenses respectively centered on said second optical sections and located between centers of said second mirrors and said second positions of said first mirrors.

13. A stereoscopic camera comprising a photosensitive surface of two juxtaposed images, two first rectilinear optical paths perpendicular to said medium, passing through centers of said images respectively, and spaced from a first stereoscopic base, two second optical paths each having a first optical section perpendicular to said photosensitive surface and a second optical section parallel to said photosensitive surface, said first optical sections being spaced from a third stereoscopic base more than said stereoscopic base, two first fixed perpendicular semi-reflecting mirrors inclined 45° to and centered on said first optical paths and said second optical sections, two second perpendicular fixed reflecting mirrors respectively parallel to said first mirrors and centered on said first and second optical sections, two first lenses centered on said first optical paths and located in front of said first mirrors respectively, and two second lenses respectively centered on second optical sections and located between centers of said second mirrors and said first mirrors.

14. A stereoscopic camera as claimed in claim 13 comprising means on a front side of said camera for housing a removable, focusing lens installed in front of said first lenses.

15. A stereoscopic camera as claimed in claim 13 comprising means for focusing said first lenses synchronously.

16. The stereoscopic camera claimed in claim 15 wherein said focusing means comprises two ring gears installed around first lens mounts screwed into said camera, said ring gears cooperating with a pinion, and said mounts having threads in the same directions.

17. The stereoscopic camera claimed in claim 15 wherein said focusing comprises two ring gears installed around first lenses mounts screwed into said camera, said ring gears gearing together, and said mounts having threads in opposite directions.

18. A stereoscopic camera as claimed in claim 13 comprising four shutter means associated respectively to said four lenses, and means for simultaneously controlling respectively an opening of the two shutter means associated to said first lenses and a closing of the two shutter means associated to said second lenses, an opening of the two shutter means associated to one of said first lenses and to one of said second lenses and the closing of the two other shutter means, and an opening of the shutter means associated to said second lenses and a closing of the two shutter means associated to said first lenses.

* * * * *